(12) United States Patent
Szparagowski et al.

(10) Patent No.: US 12,110,920 B2
(45) Date of Patent: Oct. 8, 2024

(54) HIGH PERFORMANCE PLASTIC RADIAL BEARINGS FOR ROTATING AND RECIPROCATING APPLICATIONS

(71) Applicant: Freudenberg-NOK General Partnership, Plymouth, MI (US)

(72) Inventors: Raymond L. Szparagowski, Bowling Green, OH (US); Saikrishna Sundararaman, Canton, MI (US); Simon Watling, Northumberland (GB)

(73) Assignee: Freudenberg-NOK General Partnership, Plymouth, MI (US)

( * ) Notice: Subject to any disclaimer, the term of this patent is extended or adjusted under 35 U.S.C. 154(b) by 192 days.

(21) Appl. No.: 17/850,985

(22) Filed: Jun. 27, 2022

(65) Prior Publication Data

US 2023/0417277 A1    Dec. 28, 2023

(51) Int. Cl.
| | |
|---|---|
| F16C 27/02 | (2006.01) |
| F16C 17/02 | (2006.01) |
| F16C 33/10 | (2006.01) |
| F16C 33/20 | (2006.01) |

(52) U.S. Cl.
CPC .............. F16C 27/02 (2013.01); F16C 17/02 (2013.01); F16C 33/1065 (2013.01); F16C 33/20 (2013.01); *F16C 2208/00* (2013.01); *F16C 2208/36* (2013.01)

(58) Field of Classification Search
CPC ........ F16C 17/02; F16C 27/02; F16C 27/063; F16C 29/002; F16C 33/1065; F16C 33/20; F16C 2208/00; F16C 2208/36
See application file for complete search history.

(56) References Cited

U.S. PATENT DOCUMENTS

| | | | |
|---|---|---|---|
| 3,144,919 A | 8/1964 | Foote et al. | |
| 3,601,459 A * | 8/1971 | Cutting | F16C 27/063 384/100 |
| 5,531,524 A * | 7/1996 | Brouwer | F16C 17/10 384/220 |
| 6,918,701 B2 * | 7/2005 | Ueno | F16C 33/20 384/144 |
| 9,145,160 B2 * | 9/2015 | Domig | B62D 1/184 |
| 10,100,873 B2 * | 10/2018 | Cooper | F16C 29/002 |

FOREIGN PATENT DOCUMENTS

| | | | | |
|---|---|---|---|---|
| CN | 102822544 A | 12/2012 | | |
| CN | 203297361 U | 11/2013 | | |
| CN | 105874230 A | 8/2016 | | |
| DE | 10340279 A1 * | 4/2005 | ............. | F16C 11/04 |
| EP | 0933543 A2 * | 8/1999 | | |
| WO | 2012127998 A1 | 9/2012 | | |

OTHER PUBLICATIONS

Taiwanese Office Action dated Mar. 13, 2024 (corresponding to TW 112122061).

\* cited by examiner

*Primary Examiner* — Phillip A Johnson
(74) *Attorney, Agent, or Firm* — Harness, Dickey & Pierce, P.L.C.

(57) ABSTRACT

A bearing for use between an outer member and an inner member that is movable relative to the outer member. The bearing includes a generally cylindrical plastic body having a plurality of undulations that form gradual radially inward and radially outward waves relative to a circular path.

16 Claims, 6 Drawing Sheets

HIGH PERFORMANCE PLASTIC RADIAL BEARINGS FOR ROTATING AND RECIPROCATING APPLICATIONS

FIELD

The present disclosure relates to high performance plastic radial bearings for rotating and reciprocating applications.

BACKGROUND

This section provides background information related to the present disclosure which is not necessarily prior art.

Metallic needle roller bearings, metallic bushings coated with polymers and sintered metals are very commonly used for supporting radial load for both rotating and reciprocating applications. Use of plastic bushings are also common for low PV (pressure-velocity) applications.

Plastics offer benefits including reduced weight, ease of manufacturing, reduced dry friction, damping characteristics etc., however they have limited use primarily because of material limits. Plastic/high performance plastic bearings/bushings are typically installed/retained in a metal bore and support a metal rotating/reciprocating shaft. Thermal expansion for plastics is much higher than metals and this thermal expansion difference along with their material limits pose challenges to use of plastic as radial bearing elements.

SUMMARY

This section provides a general summary of the disclosure, and is not a comprehensive disclosure of its full scope or all of its features.

According to a first aspect a bearing for use between an outer member and an inner member that is movable relative to the outer member includes a generally cylindrical plastic body having a plurality of undulations that form gradual radially inward and radially outward waves relative to a circular path. The undulations accommodate for thermal expansion of the plastic bearing relative to a metal housing and shaft.

According to a further aspect a bearing for use between an outer member and an inner member that is movable relative to the outer member, comprising a cylindrical plastic body having an inner diameter surface with a plurality of circumferentially spaced grooves.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
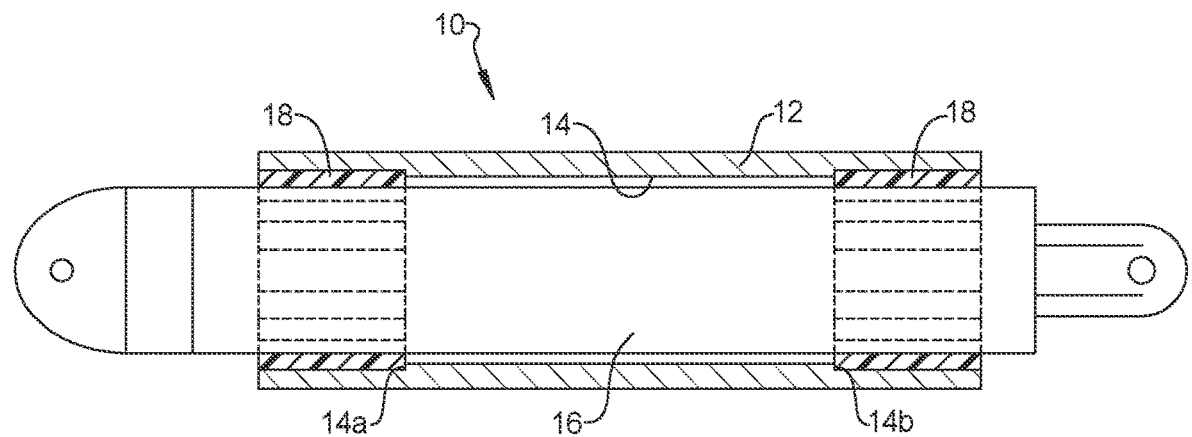
FIG. 1 is a cross-sectional view of a shaft guide system according to the principles of the present disclosure.

With reference to FIG. 1, a shaft guide system 10 is shown including a housing 12 defining an interior bore 14 and a shaft 16 received in the bore 14. The bore 14 can include one or more shoulders 14a, 14b and one or more bearings 18 are disposed between the housing 12 and the shaft 16. The bearings 18 can be disposed against the shoulders 14a, 14b within the interior bore 14 of the housing 12. The shaft 16 can be reciprocatingly and/or rotationally movable within the interior bore 14 of the housing 12.

Figure 2A:
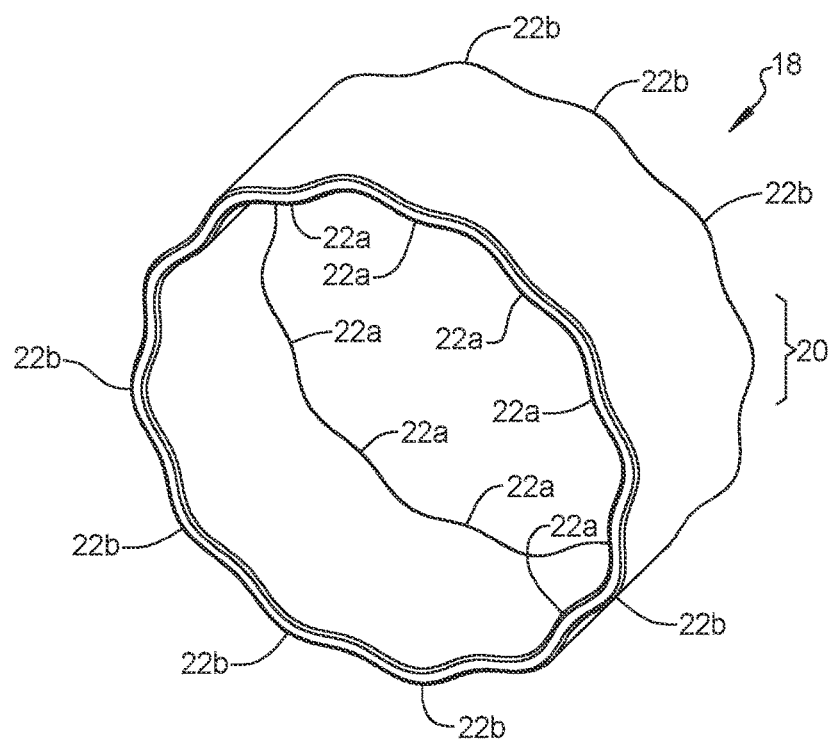
FIG. 2A is a perspective view of a bearing according to a first embodiment.
Figure 2B:
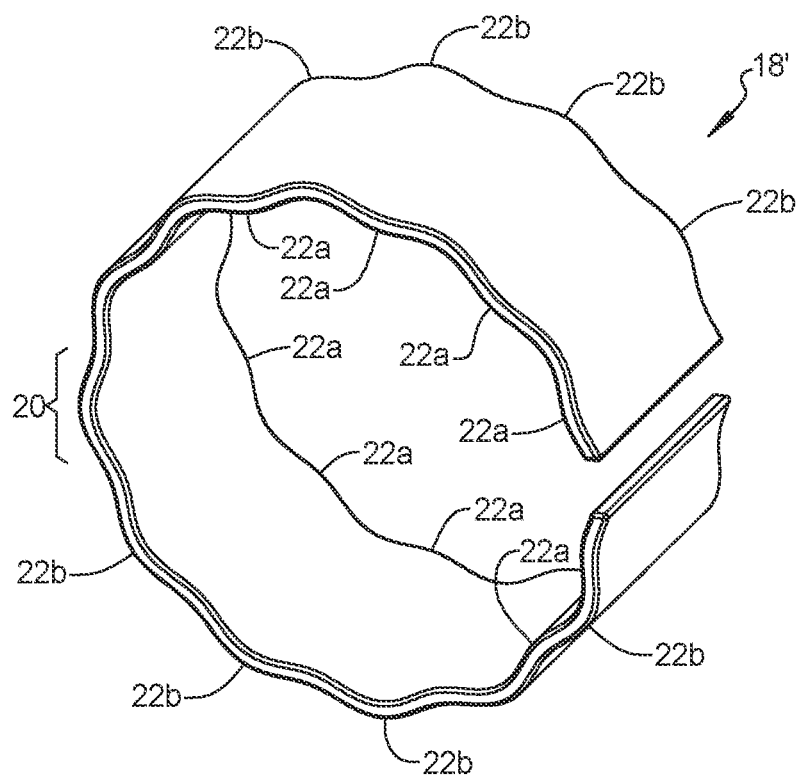
FIG. 2B is a perspective view of an alternative split bearing according to the first embodiment.
Figure 3:
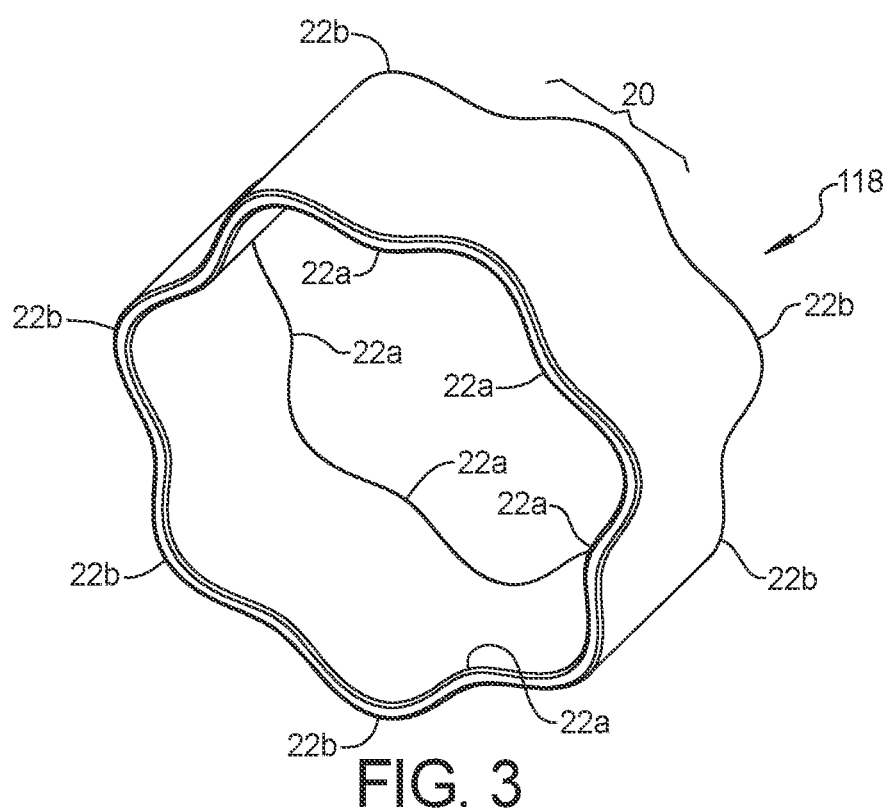
FIG. 3 is a perspective view of a bearing according to a further embodiment.

With reference to FIGS. 2A and 2B, a bearing 18, 18' according to a first embodiment is shown. The bearing 18, 18' can be made from plastic and include a generally cylindrical body that includes a plurality of undulations 20 that form gradual radially inward waves 22a and radially outward waves 22b relative to a circular path. The undulations can be rounded or "squared" including curved or flat inner and outer surfaces. In the embodiment shown, twelve (12) undulations 20 are shown although more or fewer undulations can be used. The plastic material can include PEEK or other high performance plastic material. By way of non-limiting example, FIG. 3 shows a similar bearing 118 with seven (7) undulations 20. It should be understood that the bearing 18 can be provided with six (6) or more undulations 20. A wall thickness of the bearing 18 can be constant along the radially inward and radially outward waves 22a, 22b. Plastic materials generally have a greater thermal expansion coefficient than metal, and the undulations 20 accommodate the greater thermal expansion of the bearing 18 between the metal housing 12 and metal shaft 16. The bearing 18 can be a solid ring (as shown in FIGS. 2A and 3) or a split ring 18' as shown in FIG. 2B.

Figure 4:
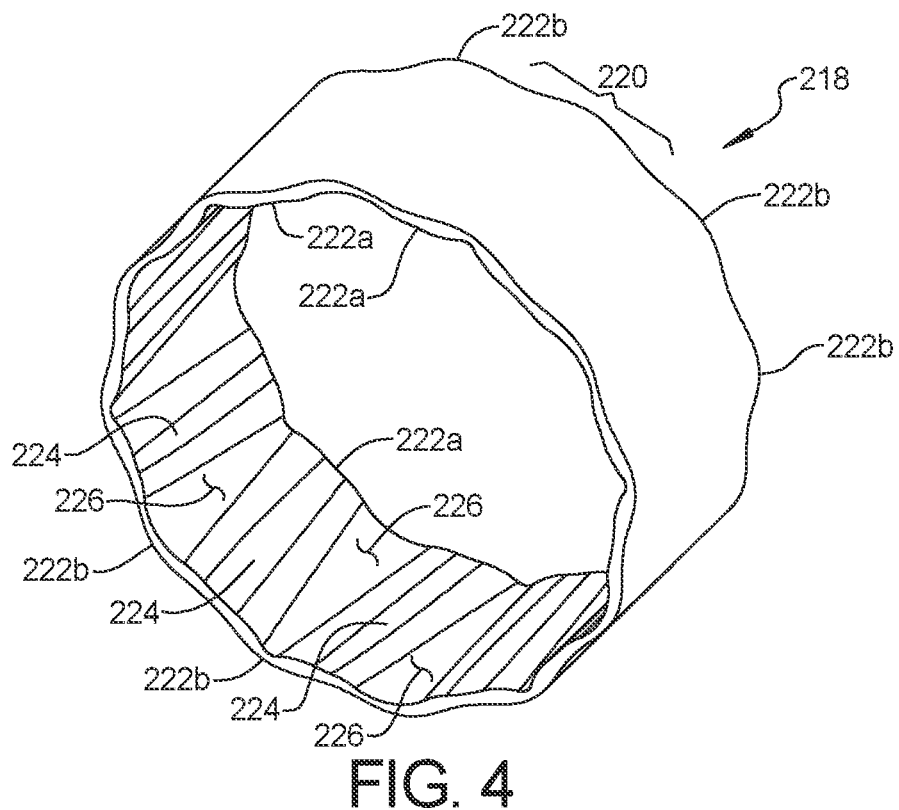
FIG. 4 is a perspective view of a bearing according to a second embodiment.

With reference to FIG. 4, a bearing 218 according to a second embodiment is shown. The bearing 218 includes a plurality of undulations 220 that form gradual radially inward waves 222a and radially outward waves 222b relative to a circular path. The undulations can be rounded or "squared" including curved or flat inner and outer surfaces. An interior surface of the bearing 218 includes a plurality of partially cylindrical land surfaces 224 along an inner peak of the radially inward waves 222a and a plurality of grooves 226 defined on an interior side of the radially outward waves 222b. The grooves 226 get narrower from one axial end to another. In the embodiment shown, the adjacent grooves 226 on the interior surface of the bearing 218 alternate so that every other groove 226 gets narrower at an opposite axial end from the adjacent grooves 226. The alternating grooves 226 tend to cause lubricant to flow in opposite axial directions. The undulations 220 accommodate the greater thermal expansion of the plastic bearing 218 between the metal housing 12 and the metal shaft 16. The bearing 218 can be a solid ring (as shown) or a split ring.

Figure 5:
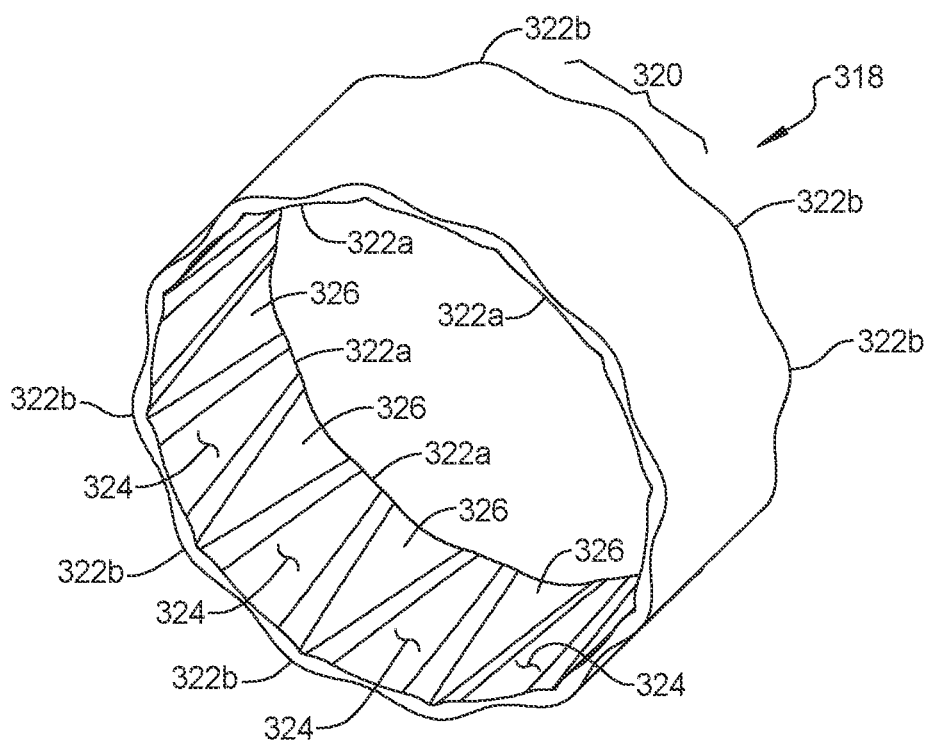
FIG. 5 is a perspective view of a bearing according to a third embodiment.

With reference to FIG. 5, a bearing 318 according to a third embodiment is shown. The bearing 318 includes a plurality of undulations 320 that form gradual radially inward waves 322a and radially outward waves 322b relative to a circular path. An interior surface of the bearing 318 includes a plurality of partially cylindrical land surfaces 324 along an inner peak of the radially inward waves 322a and a plurality of grooves 326 defined on an interior side of the radially outward waves 322b. The land surfaces 324 get narrower from one axial end to another and the grooves 326 get narrower from one axial end to another. The grooves 326 tend to cause lubricant to flow in a common axial direction. The undulations 320 accommodate the greater thermal expansion of the plastic bearing 318 between the metal housing 12 and the metal shaft 16. The bearing 318 can be a solid ring (as shown) or a split ring.

Figure 6:
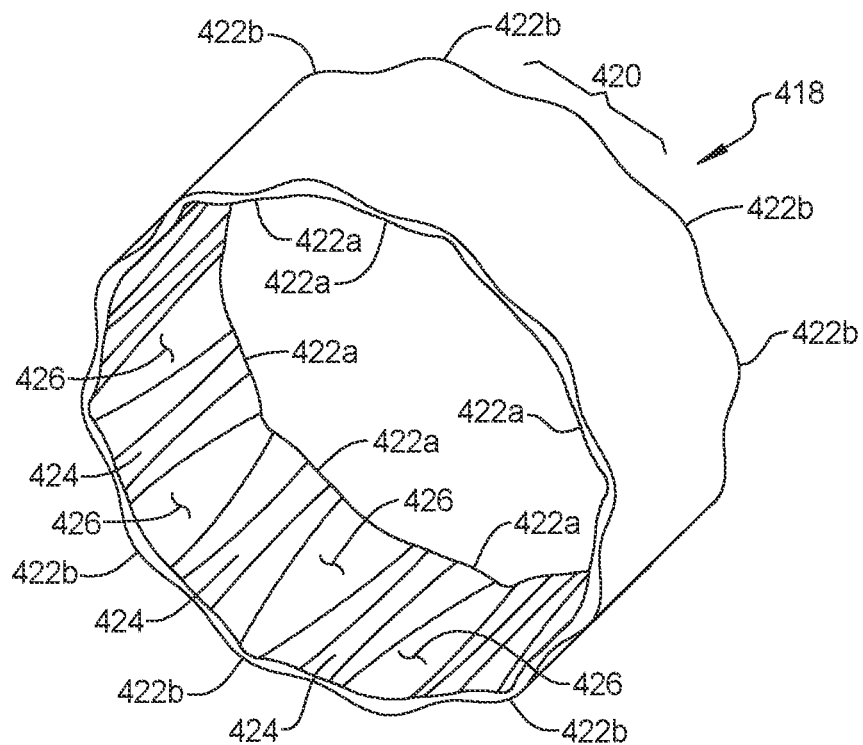
FIG. 6 is a perspective view of a bearing according to a fourth embodiment.

With reference to FIG. 6, a bearing 418 according to a fourth embodiment is shown. The bearing 418 includes a plurality of undulations 420 that form gradual radially inward waves 422a and radially outward waves 422b relative to a circular path. An interior surface of the bearing 418 includes a plurality of partially cylindrical land surfaces 424 along an inner peak of the radially inward waves 422a and a plurality of grooves 426 defined on an interior side of the radially outward waves 422b. The grooves 426 include curved side edges and get narrower from one axial end to another. In the embodiment shown, the adjacent grooves 426 on the interior surface of the bearing 418 alternate so that every other groove 426 gets narrower at an opposite axial end from the adjacent grooves 426. The alternating grooves 426 tend to cause lubricant to flow in opposite axial directions while the curved side edges tend to maintain lubricant within the grooves for a longer duration. The undulations 420 accommodate the greater thermal expansion of the plastic bearing 418 between the metal housing 12 and the metal shaft 16. The bearing 418 can be a solid ring (as shown) or a split ring.

Figure 7:
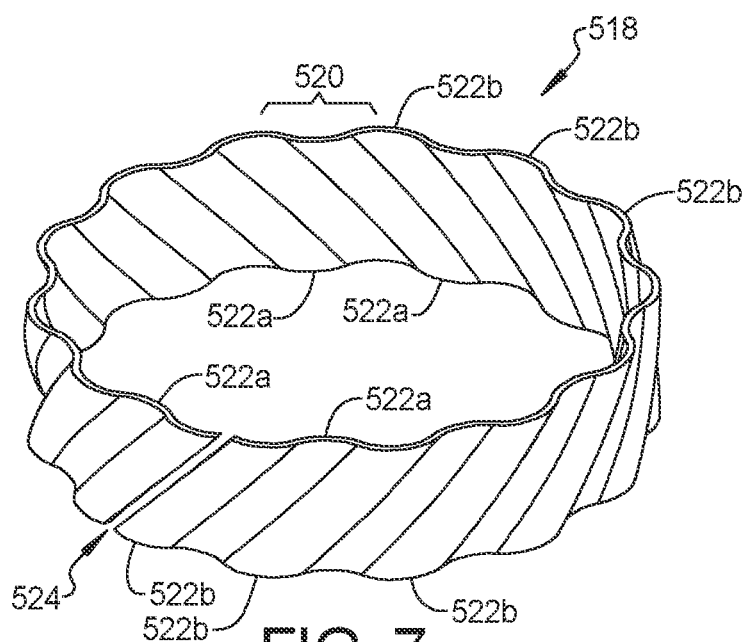
FIG. 7 is a perspective view of a bearing according to a fifth embodiment.

With reference to FIG. 7, a bearing 518 according to a fifth embodiment is shown. The bearing 518 can be made from plastic and include a generally cylindrical body that includes a plurality of undulations 520 that form gradual radially inward waves 522a and radially outward waves 522b relative to a circular path. The undulations 520 are angled such that the radially inward and radially outward waves of the plurality of undulations each have a peak surface that are non-parallel (i.e., angled) relative to a center axis of the generally cylindrical plastic body. In the embodiment shown, thirteen (13) undulations 520 are shown although more or fewer undulations can be used. A wall thickness of the bearing 518 can be constant along the radially inward and radially outward waves 522a, 522b. Plastic materials generally have a greater thermal expansion coefficient than metal, and the undulations 520 accommodate the greater thermal expansion of the bearing 518 between the metal housing 12 and shaft 16. The bearing 518 can be a split ring (with a split region 524 as shown) or a solid ring.

Figure 8:
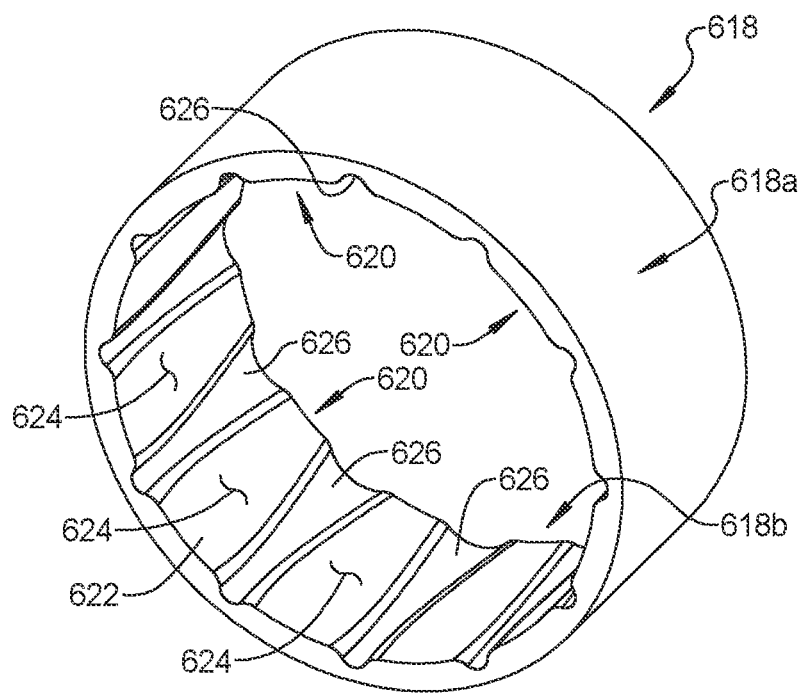
FIG. 8 is a perspective view of a bearing according to a sixth embodiment.

With reference to FIG. 8, a bearing 618 according to a sixth embodiment is shown. The bearing 618 includes a cylindrical outer surface 618a and an inner surface 618b having a plurality of undulations 620 that form gradual radially inward waves 622 relative to a circular path. An interior surface of the bearing 618 includes a plurality of partially cylindrical land surfaces 624 along an inner peak of the radially inward waves 622 and a plurality of grooves 626 defined between the radially inward waves 622. The grooves 626 include curved side edges and get narrower from one axial end to another. The bearing 618 can be a solid ring (as shown) or a split ring.

Figure 9:
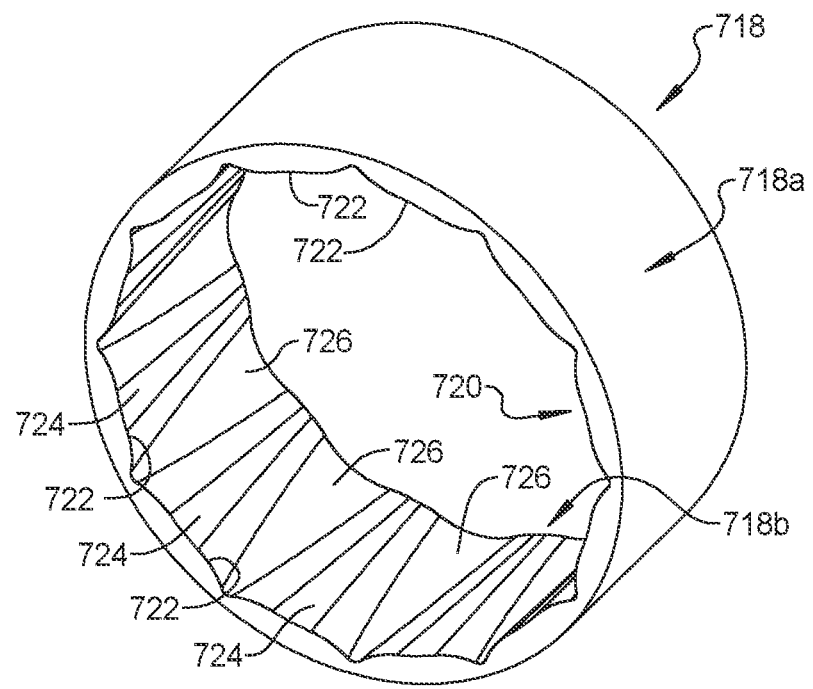
FIG. 9 is a perspective view of a bearing according to a seventh embodiment.

With reference to FIG. 9, a bearing 718 according to a seventh embodiment is shown. The bearing 718 includes a cylindrical outer surface 718a and an inner surface 718b having a plurality of undulations 720 that form gradual radially inward waves 722 relative to a circular path. An interior surface of the bearing 718 includes a plurality of partially cylindrical land surfaces 724 along an inner peak of the radially inward waves 722 and a plurality of grooves 726 defined between the radially inward waves 722. The grooves 726 include straight side edges and get narrower from one axial end to another. The bearing 718 can be a solid ring (as shown) or a split ring.

Figure 10:
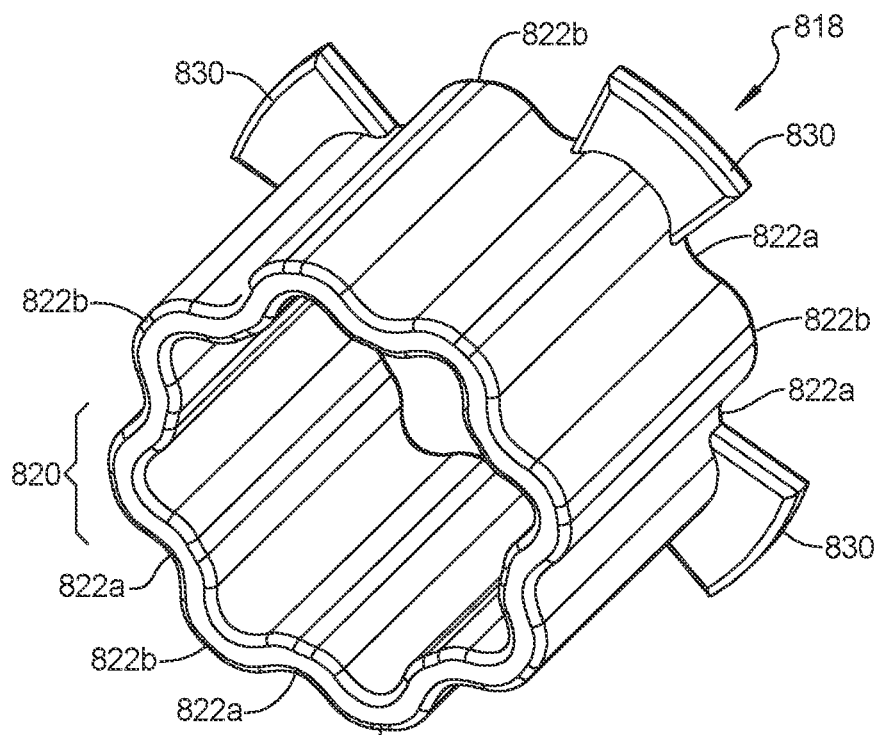
FIG. 10 is a perspective view of a bearing according to an eighth embodiment.

With reference to FIG. 10, a bearing 818 according to an eighth embodiment is shown. The bearing 818 can be made from plastic and include a generally cylindrical body that includes a plurality of undulations 820 that form gradual radially inward waves 822a and radially outward waves 822b relative to a circular path. In the embodiment shown, eight (8) undulations 820 are shown although more or fewer undulations can be used. The undulations can be rounded or "squared" including curved or flat inner or outer surfaces. A plurality of tabs 830 can be provided at an end of the bearing 818 and extend radially outward from an inboard end of the undulations 820 (overlapping the undulations 820) of the bearing 818. In an assembled state, the tabs 830 can be disposed against an end surface of a housing 12 to limit the insertion distance of the bearing 818 within the housing 12. The plastic material can include PEEK or other high performance plastic material. A wall thickness of the bearing 818 can be constant along the radially inward and radially outward waves 822a, 822b. Plastic materials generally have a greater thermal expansion coefficient than metal, and the undulations 820 accommodate the greater thermal expansion of the bearing 818 between the metal housing 12 and metal shaft 16. The bearing 818 can be a solid ring or a split ring.

Figure 11:
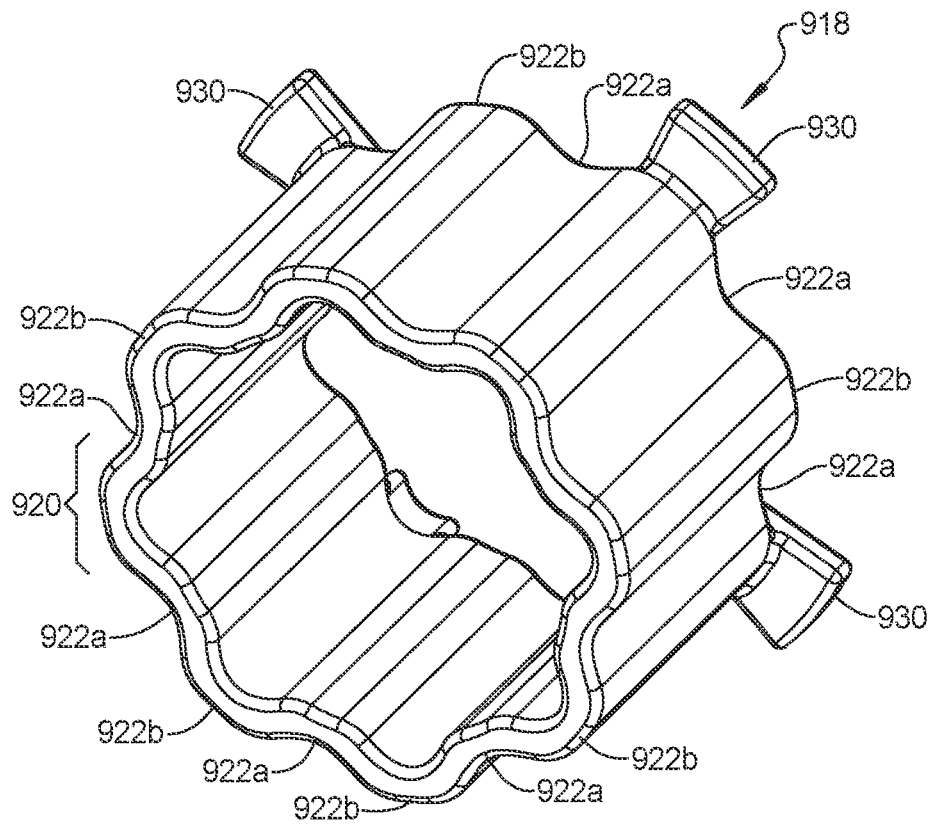
FIG. 11 is a perspective view of a bearing according to a ninth embodiment.

With reference to FIG. 11, a bearing 918 according to a ninth embodiment is shown. The bearing 918 can be made from plastic and include a generally cylindrical body that includes a plurality of undulations 920 that form gradual radially inward waves 922a and radially outward waves 922b relative to a circular path. The undulations can be rounded or "squared" including curved or flat inner and outer surfaces. In the embodiment shown, eight (8) undulations 920 are shown although more or fewer undulations can be used. A plurality of tabs 930 can be provided at an end of the bearing 918 and extend radially outward from an axial end of the bearing 918. In an assembled state, the tabs 930 can be disposed against an end surface of a housing 12 to limit the insertion distance of the bearing 918 within the housing 12 with the end of the undulations being flush with the end of the bore in the housing. The plastic material can include PEEK or other high performance plastic material. A wall thickness of the bearing 918 can be constant along the radially inward and radially outward waves 922a, 22b. Plastic materials generally have a greater thermal expansion coefficient than metal, and the undulations 920 accommodate the greater thermal expansion of the bearing 918 between the metal housing 12 and metal shaft 16. The bearing 918 can be a solid ring or a split ring.

The bearings of the present disclosure can accommodate thermal changes through undulations to limit and accommodate plastic deformation. The grooves and or waves on the inner diameter surface of the bearings help minimize lubricated friction and the use of high performance plastic materials helps minimize dry friction.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing for use between an outer member and an inner member that is movable relative to the outer member, comprising:
    a generally cylindrical plastic body having a plurality of generally sinusoidal undulations that form radially inward and radially outward waves relative to a circular path.

2. The bearing according to claim 1, wherein the generally cylindrical plastic body has a constant wall thickness.

3. The bearing according to claim 1, wherein the generally cylindrical plastic body is a split plastic body.

4. The bearing according to claim 1, wherein the plurality of undulations include at least six undulations.

5. A bearing for use between an outer member and an inner member that is movable relative to the outer member, comprising:
    a generally cylindrical plastic body having a plurality of undulations that form radially inward and radially outward waves relative to a circular path; and
    wherein the radially inward and radially outward waves of the plurality of undulations each have a peak surface that is non-parallel to a center axis of the generally cylindrical plastic body.

6. The bearing according to claim 5, wherein the plurality of undulations are substantially identical in shape.

7. A bearing for use between an outer member and an inner member that is movable relative to the outer member, comprising:
    a generally cylindrical plastic body having a plurality of undulations that form radially inward and radially outward waves relative to a circular path;
    wherein the plurality of undulations include adjacent undulations on an interior surface having a differing alternating pattern; and
    wherein the adjacent undulations of the interior surface include grooves that get narrower from one axial end to another.

8. The bearing according to claim 7, further comprising at least one tab extending radially from an end of the generally cylindrical plastic body.

9. A bearing for use between an outer member and an inner member that is movable relative to the outer member, comprising:
    a cylindrical plastic body having an inner diameter surface with a plurality of circumferentially spaced grooves; and
    wherein the plurality of circumferentially spaced grooves widen from one axial end of the cylindrical plastic body to an opposite axial end of the cylindrical plastic body.

10. The bearing according to claim 9, wherein the inner diameter surfaces of the cylindrical plastic body includes partially cylindrical land surfaces between the plurality of circumferentially spaced grooves, the partially cylindrical land surface being configured to engage a shaft.

11. A shaft guide system, comprising:
a metal outer member;
a metal inner member that is movable relative to the metal outer member; and
a generally cylindrical plastic body having a plurality of generally sinusoidal undulations that form radially inward and radially outward waves relative to a circular path.

12. The shaft guide system according to claim 11, wherein the generally cylindrical plastic body has a constant wall thickness.

13. The shaft guide system according to claim 11, wherein the generally cylindrical plastic body as a varying wall thickness.

14. The shaft guide system according to claim 11, wherein the generally cylindrical plastic body is a split plastic body.

15. The shaft guide system according to claim 11, further comprising at least one tab extending radially from an end of the generally cylindrical plastic body.

16. The shaft guide system according to claim 11, wherein the plurality of undulations are substantially identical in shape.

* * * * *